United States Patent
Köyer et al.

(10) Patent No.: US 12,325,921 B2
(45) Date of Patent: *Jun. 10, 2025

(54) METHOD FOR MANUFACTURING A SHEET METAL COMPONENT FROM A FLAT STEEL PRODUCT PROVIDED WITH A CORROSION PROTECTION COATING

(71) Applicant: ThyssenKrupp Steel Europe AG, Duisburg (DE)

(72) Inventors: Maria Köyer, Dortmund (DE); Manuela Ruthenberg, Dortmund (DE); Janko Banik, Altena (DE); Ulrich Etzold, Kerken (DE)

(73) Assignee: ThyssenKrupp Steel Europe AG, Duisburg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/400,261

(22) Filed: Dec. 29, 2023

(65) Prior Publication Data

US 2024/0133014 A1 Apr. 25, 2024
US 2024/0229213 A9 Jul. 11, 2024

Related U.S. Application Data

(63) Continuation of application No. 17/613,738, filed as application No. PCT/EP2020/064836 on May 28, 2020, now Pat. No. 11,920,243.

(30) Foreign Application Priority Data

Jun. 3, 2019 (WO) ................ PCT/EP2019/064332

(51) Int. Cl.
*C23C 2/12* (2006.01)
*C21D 9/46* (2006.01)
(Continued)

(52) U.S. Cl.
CPC .................. *C23C 2/12* (2013.01); *C21D 9/46* (2013.01); *C22C 38/02* (2013.01); *C22C 38/04* (2013.01);
(Continued)

(58) Field of Classification Search
None
See application file for complete search history.

(56) References Cited

U.S. PATENT DOCUMENTS 8,481,172 B2 7/2013 Warnecke et al.
8,733,142 B2 5/2014 Spehner et al.
(Continued)

FOREIGN PATENT DOCUMENTS

CN 102421928 A 4/2012
CN 102985570 A 3/2013
(Continued)

*Primary Examiner* — Daniel J. Schleis
(74) *Attorney, Agent, or Firm* — The Webb Law Firm

(57) ABSTRACT

A method for manufacturing a sheet metal component including: annealing a flat steel product comprising 0.05-0.5% C, 0.5-3% Mn, 0.06-1.7% Si, ≤0.06% P, ≤0.01% S, ≤1.0% Al, ≤0.15% Ti, ≤0.6% Nb, ≤0.01% B, ≤1.0% Cr, ≤1.0% Mo, ≤1.0% Cr+Mo, ≤0.2% Ca, ≤0.1% V, remainder iron and impurities in a continuous furnace under an atmosphere consisting of 0.1-15% hydrogen and remainder nitrogen with a specific dew point and temperature profile; applying a coating consisting of <15% Si, ≤5% Fe, in total 0.1-5% of at least one alkaline earth or transition metal and a remainder Al and unavoidable impurities; heating the flat steel product to >Ac3 and ≤1000° C. for a time sufficient to introduce a heat energy quantity >100,000-800,000 kJs; hot-forming the flat steel product to form the component; and cooling at least one section of the component at a cooling rate sufficient to generate hardening structures.

8 Claims, 1 Drawing Sheet

(51) Int. Cl.
  *C22C 38/02* (2006.01)
  *C22C 38/04* (2006.01)
  *C22C 38/06* (2006.01)
  *C22C 38/14* (2006.01)
  *C22C 38/32* (2006.01)
  *C23C 2/28* (2006.01)
  *C23C 2/40* (2006.01)
  *C23F 15/00* (2006.01)

(52) U.S. Cl.
  CPC .............. *C22C 38/06* (2013.01); *C22C 38/14* (2013.01); *C22C 38/32* (2013.01); *C23C 2/28* (2013.01); *C23C 2/40* (2013.01); *C23F 15/00* (2013.01)

(56) References Cited

U.S. PATENT DOCUMENTS

| | | | |
|---|---|---|---|
| 11,920,243 B2 * | 3/2024 | K?yer | B32B 15/012 |
| 2013/0180305 A1 | 7/2013 | Warnecke et al. | |
| 2013/0206284 A1 | 8/2013 | Norden et al. | |
| 2013/0224516 A1 | 8/2013 | Kusinski et al. | |
| 2017/0002450 A1 | 1/2017 | Kim et al. | |
| 2017/0198152 A1 | 7/2017 | Blumenau et al. | |
| 2017/0260601 A1 | 9/2017 | Banik et al. | |
| 2018/0312955 A1 | 11/2018 | Machalitza et al. | |
| 2020/0216925 A1 | 7/2020 | Banik et al. | |

FOREIGN PATENT DOCUMENTS

| | | |
|---|---|---|
| CN | 103080363 A | 5/2013 |
| CN | 103562419 A | 2/2014 |
| CN | 103597100 A | 2/2014 |
| CN | 105531385 A | 4/2016 |
| CN | 105849305 A | 8/2016 |
| CN | 106133155 A | 11/2016 |
| CN | 108425069 A | 8/2018 |
| CN | 109136775 A | 1/2019 |
| DE | 102014109943 B3 | 11/2015 |
| DE | 102017210201 A1 | 12/2018 |
| EP | 2086755 B1 | 8/2009 |
| EP | 2213757 A2 | 8/2010 |
| EP | 2664682 A1 | 11/2013 |
| EP | 2993248 A1 | 3/2016 |
| JP | 200334845 A | 2/2003 |
| JP | 2005272967 A | 10/2005 |
| JP | 2009263692 A | 11/2009 |
| JP | 201018856 A | 1/2010 |
| JP | 201018860 A | 1/2010 |
| JP | 2011512455 A | 4/2011 |
| JP | 2017502174 A | 1/2017 |
| JP | 2017528595 A | 9/2017 |
| JP | 2017536472 A | 12/2017 |
| KR | 1020150075435 A | 7/2015 |
| WO | 2011104443 A1 | 9/2011 |
| WO | 2014166630 A1 | 10/2014 |
| WO | 2014171417 A1 | 10/2014 |

* cited by examiner

METHOD FOR MANUFACTURING A SHEET METAL COMPONENT FROM A FLAT STEEL PRODUCT PROVIDED WITH A CORROSION PROTECTION COATING

CROSS-REFERENCE TO RELATED APPLICATIONS

This application is a continuation of U.S. patent application Ser. No. 17/613,738, filed Nov. 23, 2021, which is the United States national phase of International Application No. PCT/EP2020/064836 filed May 28, 2020, and claims priority to International Application No. PCT/EP2019/064332 filed Jun. 3, 2019, the disclosures of which are hereby incorporated by reference in their entirety.

BACKGROUND OF THE INVENTION

Field of the Invention

The invention relates to a method for manufacturing a sheet metal component from a flat steel product which is provided with a corrosion protection coating.

Description of Related Art

Flat steel products are understood here as rolling products, the length and width of which are each significantly greater than their thickness. These include steel strips and steel sheets in particular.

Unless explicitly stated otherwise, information on the contents of alloy constituents is always provided in wt. % in this text.

The proportions of certain components of an atmosphere, in particular an annealing atmosphere, are, on the other hand, indicated in vol. %, unless otherwise noted.

A method of the type indicated at the outset is known from EP 2 993 248 A1. A flat steel product is used as the starting product for this method, the steel substrate of which consists of so-called "MnB steel". Steels of this type are standardised in EN 10083-3 and have good hardenability. They enable reliable process control during hot pressing, through which it is economically possible to still cause martensite hardening in the tool during hot forming without additional cooling. A typical example of such a steel is the steel known under the designation 22MnB5, which can be found in the steel key 2004 under the material number 1.5528. Typically, the market-available fully-settled 22MnB5 steel contains, in addition to iron and unavoidable impurities, (in wt. %) 0.10-0.250% C, 1.0-1.4% Mn, 0.35-0.4% Si, up to 0.03% P, up to 0.01% S, up to 0.040% Al, up to 0.15% Ti, up to 0.1% Nb, in total up to 0.5% Cr+Mo, and up to 0.005% B. In order to protect the flat steel products consisting of such composite steel against corrosive attacks and at the same time to minimise the risk of hydrogen absorption during the heating required for hot forming, the flat steel products are provided with an aluminium-based corrosion protection coat according to the known method, which contains effective contents of at least one alkaline earth or transition metal as an additional alloy component of 0.005-0.7 wt. %. In addition, Si contents of 3-15 wt. % and Fe contents of up to 5 wt. % may also be present in the coat. As the at least one alkaline earth or transition metal of the protective coat, Mg is preferably used here in contents of 0.1-0.5 wt. %, wherein calcium, strontium, sodium or barium are also considered alternatively or additionally. The Al-based protective coat can be applied to the steel substrate by hot-dip coating, also known in technical terms as "hot-dip aluminising", or by a gas separation process, e.g. the known PVD (Physical Vapour Deposition) or CVD (Chemical Vapour Deposition).

Special requirements for the manner in which the corrosion protection coat is applied to the steel substrate consisting of an MnB steel are not mentioned in the prior art explained above. In the case of heating of a board coated in the manner described above in the conventional manner under a normal atmosphere over a period of 360-800 s to a temperature of 900° C., due to the presence of the alkaline earth or transition metal in the coat, at most a minimal hydrogen absorption in the steel substrate occurs, so that the risk of so-called "hydrogen embrittlement" is minimised.

In practical use, however, it can be seen that, despite this success, components formed from the flat steel products produced in the manner described above have optimised strengths, but cannot always meet the increasingly higher requirements that are placed on the behaviour of sheet metal components manufactured from such flat steel products in the case of resistance welding and on the adhesion of organic layers, such as painting and the like, on such sheet metal components.

DE 10 2017 210 201 A1 also deals with a method for manufacturing an aluminium-based steel component provided with a metallic anti-corrosive coat. For this purpose, a flat steel product is provided which consists of, in wt. %, 0.15 to 0.50% C, 0.50 to 3.0% Mn, 0.10 to 0.50% Si, 0.01 to 1.00% Cr, up to 0.20% Ti, up to 0.10% Al, up to 0.10% P, up to 0.1% Nb, up to 0.01% N, up to 0.05% S and up to 0.1% B, the remainder of Fe and unavoidable impurities and is coated with an Al coating which consists of, in wt. %, 3 to 15% Si, 1 to 3.5% Fe, up to 0.5% alkaline and/or alkaline earth metals, the remainder of Al and unavoidable impurities. The provided sheet metal is annealed in an oven at a temperature and over a period of time, which are linked to each other by a parameter calculated according to a complex formula. Depending on the furnace dwell time and the temperature, a so-called interdiffusion zone is to be formed at the transition between substrate and coating, in which no martensitic structure occurs during press hardening, but which is also not to be assigned to the Al coating. This interdiffusion zone extends starting from the centre of the flat steel product from the thickness from which there is no more martensitic structure in the component to the thickness from which the iron content of the Al coating is continuously 85 wt. % and the Al content is continuously 10 wt. %. Information on how the interdiffusion zone could be designed in detail or instructions on how the formation and composition of the interdiffusion zone could be controlled in a targeted manner with regard to certain surface properties of the coating are also not provided in this prior art. Instead, the focus here is on considerations for improving the deformation behaviour of the Al coating, in particular the achievable bending angle.

Against this background, the object has emerged to indicate a method that makes it possible to form sheet metal components from a flat steel product of the type explained above, which meet the highest requirements for their weldability and thereby have optimal conditions for a coating with an organic coat, in particular for painting.

SUMMARY OF THE INVENTION

It goes without saying that when carrying out the method according to the invention, the person skilled in the art not only carries out the method steps explained herein, but also carries out all other steps and activities that are usually carried out in the practical implementation of such methods in the prior art if the necessity arises.

In a method according to the invention for manufacturing a sheet metal component from a flat steel product which is provided with a corrosion protection coating, at least the following work steps are therefore carried out:

a) providing a flat steel product which is produced from a steel which (in wt. %) consists of 0.05-0.5% C, 0.5-3% Mn, 0.06-1.7% Si, up to 0.06% P, up to 0.01% S, up to 1.0% Al, up to 0.15% Ti, up to 0.6% Nb, up to 0.01% B, up to 1.0% Cr, up to 1.0% Mo, wherein the total of the contents of Cr and Mo is at most 1.0%, up to 0.2% Ca, up to 0.1% V, and as the remainder of iron and unavoidable impurities;

b) annealing the flat steel product in a continuous furnace having four zones A, B, C, D, which are passed through successively by the flat steel product and in which the flat steel product is annealed under an annealing atmosphere consisting in each case of 0.1-15 vol. % hydrogen and as the remainder of nitrogen as well as technically unavoidable impurities with a dew point temperature $TP_A$, $TP_B$, $TP_C$, $TP_D$ at an annealing temperature $GT_A$, $GT_B$, $GT_C$, $GT_D$, the following specifications apply:

| Zone | Dew point temperature TP | Annealing temperature GT |
|---|---|---|
| A | $-10°$ C. $\leq TP_A \leq -25°$ C. | $800°$ C. $\leq GT_A \leq 950°$ C. |
| B | $-27°$ C. $\leq TP_B \leq -41°$ C. | $800°$ C. $\leq GT_B \leq 930°$ C. |
| C | $-30°$ C. $\leq TP_C \leq -80°$ C. | $800°$ C. $\leq GT_C \leq 950°$ C. |
| D | $-30°$ C. $\leq TP_D \leq -20°$ C. | $750°$ C. $\leq GT_D \leq 950°$ C. | c) applying a corrosion protection coating to the flat steel product obtained in work step b), wherein the corrosion protection coating consists of (in wt. %) up to 15% Si, up to 5% Fe, in total 0.1-5% of at least one alkaline earth or transition metal and as the remainder of Al;

d) optionally: dress rolling the flat steel product provided with the corrosion protection coating;

e) optionally: separating a board from the flat steel product;

f) heating the flat steel product or the board to a hot forming temperature which is higher than the Ac3 temperature of the steel of the flat steel product and does not exceed 1000° C. for a holding time sufficient to introduce a heat energy quantity Js of more than 100,000 kJs and at most 800,000 kJs into the flat steel product or the board;

g) hot forming the flat steel product heated to the hot forming temperature or the board heated to the hot forming temperature into the sheet metal component;

h) cooling at least one section of the component at a cooling rate sufficient to generate a hardening structure in the section of the sheet metal component.

The invention is based on the knowledge that for the behaviour of sheet metal components which are provided with an aluminium-based ("Al-based") corrosion protection coating, in the case of resistance welding and for the adhesion of an organic coating, in particular painting, on such sheet metal components, it is not only the composition of the boundary layer between the corrosion protection coating and the ambient atmosphere that matters, but in particular that parameters such as the roughness and conductivity of the overall coat also play a decisive role here. In this case, the manner of annealing according to the invention (work step b)) prior to applying the corrosion protection coating (work step c)) creates the conditions for the component processed according to the invention to have an optimally homogeneous corrosion protection coating.

Thus, components produced according to the invention typically have a corrosion protection coating, which is formed by a plurality of layers of different composition. By guiding the dew point and annealing temperature according to the invention during annealing in the continuous annealing furnace to prepare the subsequent application of the corrosion protection coating, a significant reduction of the pores contained in the coating is achieved.

Through the annealing parameters selected according to the invention during annealing (work step b)) prior to coating, it is achieved that pure iron ("Fe") is present on at least 70% of the surface of the finished annealed flat steel product. This results in a good bonding of the subsequently applied Al-based coating, by forming an iron-aluminium layer ("Fe—Al layer") at the transition from the steel substrate to the corrosion protection coating. On the other hand, iron reaches the layer sufficiently and in a homogeneously uniform distribution, through which the conductivity of the layer is improved and the behaviour during resistance welding is thereby optimised.

In the event that the flat steel product provided in work step b) is already a blank which is directly suitable for forming into the component, work step e) can be omitted. If, on the other hand, the flat steel product provided is a steel strip or a larger steel sheet, a board of suitable size is separated from this in work step e).

The flat steel product annealed and coated in the manner according to the invention (work steps b), c)) or the separated (work step e)) board are heated to the hot forming temperature (work step f)) for hot forming (work step g)). The iron already present in the homogeneous boundary layer of the corrosion protection coating can diffuse evenly into the coating without any significant defects. At the same time, the alkaline earth or transition metal provided according to the invention in the corrosion protection coating diffuses to the surface due to its oxygen affinity and forms an oxide layer there. Due to their comparable atomic size, the iron atoms can exchange places in a 1:1 ratio with the alkaline earth or transition metal atoms and are thus incorporated into the metal grid, so that at most a negligible number of defects can also occur due to the diffusion of the alkaline earth or transition metal atoms. As a result of the reduction of the defects achieved according to the invention, these defects cannot agglomerate into pores in the corrosion protection coating of a component according to the invention, so that a component according to the invention is characterised by a significantly reduced number of pores compared with conventionally produced components, for example, produced according to the sample of EP 2 086 755 B1.

The effects utilised by the invention occur particularly reliably if the additionally present alkaline earth or transition metal is magnesium ("Mg"), thus if Mg is present alone or in combination with other elements belonging to the group of alkaline earth or transition metals in the contents provided according to the invention in the corrosion protection coating of a flat steel product processed according to the invention.

The method according to the invention is suitable for the manufacture of components from flat steel products with a large thickness spectrum. Thus, flat steel products, whose thickness is 0.6-7 mm, can be processed with the method according to the invention.

The production of the flat steel products provided in work step a) can take place in any manner known from the prior art. The method according to the invention is in particular suitable for processing flat steel products with a thickness of 0.8-4 mm, in particular 0.8-3 mm. Flat steel products with greater thicknesses of more than 3 mm are typically processed in the hot-rolled state, while thinner sheets are typically provided in the cold-rolled state.

In work step a) flat steel products can also be provided for the method according to the invention which have obtained different thicknesses by means of flexible or partial rolling over length and/or width. Similarly, in work step a) for the method according to the invention, flat steel products composed of different sheet metal blanks welded together or of similarly composed flat steel products and steel strips which are welded together and together form the flat steel product to be processed can be provided for the process according to the invention.

The flat steel product provided according to the invention in each case consists of a steel which has a composition typical for MnB steels. Such steels typically have yield strengths of 250-580 MPa and tensile strengths of 400-720 MPa in the delivered state.

Thus, a flat steel product provided according to the invention consists of
- 0.05-0.5 wt. % of carbon ("C"), wherein the C content is preferably 0.07-0.4 wt. %,
- 0.5-3 wt. % of manganese ("Mn"), wherein the Mn content is preferably 0.8-2.5 wt. %, in particular 1.0-2.0 wt. %,
- 0.06-1.7 wt. % of silicon ("Si"), wherein the Si content is preferably 0.06-1.1 wt. %, in particular 0.06-0.9 wt. %,
- up to 0.06 of phosphorus ("P"), wherein the P content is at most 0.03 wt. %,
- up to 0.01 wt. % of sulfur ("S"),
- up to 1.0 wt. % of aluminium ("Al"), wherein the Al content is preferably at most 0.5 wt. %, in particular at most 0.1 wt. %,
- up to 0.15 wt. % of titanium ("Ti"),
- up to 0.6 wt. % of niobium ("Nb"), wherein the Nb content is preferably up to 0.1 wt. %,
- up to 0.01 wt. % of boron ("B"), wherein the B content preferably up to 0.005 wt. %,
- up to 1.0 wt. % of chromium ("Cr"), wherein the Cr content is preferably up to 0.5 wt. %, in particular up to 0.2 wt. %,
- up to 1.0 wt. % of molybdenum ("Mo"), wherein the Mo content is preferably up to 0.5 wt. %, in particular up to 0.2 wt. %,
- wherein for the content % Cr of Cr and the content % Mo of Mo the following applies % Cr+% Mo 1 wt. %,
- optionally up to 0.2 wt. %, in particular up to 0.1 wt. %, of calcium ("Ca"),
- optionally up to 0.1 wt. % of vanadium ("Va"),
and as the remainder of iron and unavoidable impurities.

Due to their property profile, in particular their potential for the development of high strengths in the finished hot-formed and cooled component, flat steel products, which in a manner known per se consist of 0.07-0.4 wt. % C, 1.0-2 wt. % Mn, 0.06-0.4 wt. % Si, up to 0.03 wt. % P, up to 0.01 wt. % S, up to 0.1 wt. % Al, up to 0.15 wt. % Ti, up to 0.6 wt. % Nb, up to 0.005 wt. % B, up to 0.5 wt. % Cr, up to 0.5 wt. % Mo are particularly interesting in practice, wherein the total of the contents of Cr and Mo is at most 0.5 wt. %, the remainder consisting of iron and unavoidable impurities.

This includes steels already in series use, which consist of 0.07-0.4 wt. % C, 1.0-1.5 wt. % Mn, 0.3-0.4 wt. % Si, up to 0.03 wt. % P, up to 0.01 wt. % S, up to 0.05 wt. % Al, up to 0.15 wt. % Ti, up to 0.6 wt. % Nb, up to 0.005 wt. % B, up to 0.5 wt. % Cr, up to 0.5 wt. % Mo, wherein the total of the contents of Cr and Mo is at most 0.5 wt. % and consist of iron and unavoidable impurities as the remainder. Such composite steels achieve tensile strengths of up to 2000 MPa after hot forming and cooling.

As already mentioned, annealing (work step b)) completed in four uninterrupted successive steps A, B, C, D on the respectively processed flat steel product produces a surface which is largely completely covered, i.e. to at least 70%, in particular to at least 80% or at least 90%, by pure Fe. For this purpose, in zones A-D of the continuous annealing furnace used according to the invention, particularly matched dew point and annealing temperatures are set in each case.

The annealing carried out in work step b) in zones A-D takes place in each case under an annealing atmosphere containing 0.1-15 vol. % hydrogen, the remainder of which consists of nitrogen and unavoidable impurities in each case, wherein the total of the impurities is typically at most 5 vol. %, in particular at most 4 vol. % or preferably at most 3 vol. %.

All of the information provided below for annealing temperatures $GT_A$, $GT_B$, $GT_C$ and $GT_D$ refer to the average furnace chamber temperature during the strip throughput.

Before entering Zone A of the continuous furnace operated according to the invention, a wide range of oxide products are present on the surface of the flat steel product provided according to the invention, which have a negative effect with regard to the quality of the coating and in particular with regard to the pore formation in the coating.

Through the continuous annealing according to the invention, these oxides are converted so that, in the technical sense, only Fe is present on the surface of the flat steel product after the annealing.

By setting the dew point temperature $TP_A$ to $-10°$ C. to $-25°$ C. and the annealing temperature $GT_A$ to 800-950° C. in zone A of the continuous furnace, the oxides present on the flat steel product are overlaid with iron oxides. In order to achieve this in a particularly targeted manner, the annealing temperature $GT_A$ can be 810-940° C. and the dew point temperature $TP_A$ can be $-15$--$25°$ C. in zone A of the continuous furnace.

In zones B and C, the iron oxides are reduced, so that iron is present on the surface after zone C. In zone B, the dew point temperature $TP_B$ of the annealing atmosphere prevailing there is then reduced to $-27°$ to $-41°$ C. and the annealing temperature $GT_B$ is maintained at 800-930° C., wherein it has proven to be particularly reliable in terms of the desired effect if the annealing temperature $GT_B$ in zone B of the continuous furnace is 800-900° C. in the case of annealing completed in work step b).

In zone C, the dew point temperature $TP_C$ of the annealing atmosphere prevailing there is then further reduced to $-30°$ C. to $-80°$ C. and the annealing temperature $GT_C$ is maintained at 800-950° C. in order to complete the reduction of the iron oxide into iron.

This effect can be achieved particularly reliably if the annealing temperature $GT_C$ is 800-920° C. and the dew point temperature $TP_C$ is $-30°$ C. to $-50°$ C. in the case of the annealing completed in work step b) in zone C of the continuous furnace.

In zone D, the dew point temperature $TP_D$ of the annealing atmosphere prevailing there is then increased to $-30°$ C. to $-20°$ C. and the annealing temperature $GT_D$ is maintained at 750-950° C. in order to temper the flat steel product in such a way that on the one hand its recrystallisation can take place and on the other hand the previously achieved pure iron surface is retained. This effect can then be achieved particularly reliably if the annealing temperature $GT_D$ is 780-930° C. in the case of the annealing completed in work step b) in zone D of the continuous furnace.

The lambda value λ describes the ratio of the masses of air to fuel introduced into the continuous furnace and in the annealing atmosphere maintained in zones A-D of a continuous furnace used according to the invention is typically 0.95-1.1 in the case of annealing completed in work step b) of the method according to the invention.

The prerequisite for the effects achieved according to the invention is the presence of at least one alkaline earth or transition metal in the aluminium (Al)-based corrosion protection coating applied after the annealing according to the invention (work step b).

Thus, in the coat of a flat steel product processed according to the invention after applying the corrosion protection coating (work step c)) and before heating for hot forming (work step f)), at least 0.1-5 wt. % of at least one alkaline earth or transition metal and as the remainder Al and unavoidable impurities are present. Here, alkaline earth or transition metal contents of at least 0.11 wt. % have proven to be particularly favourable in terms of reliability, with which the positive effects of the presence of the at least one alkaline or transition metal in the coat applied according to the invention can be utilised. If the alkaline earth or transition metal content is over 5 wt. %, increased oxide formation would occur in the melting crucible, which would reduce the surface quality. In hot forming, too much oxide would also form, which would, on the one hand, promote the water fission to hydrogen and oxygen and, as a result, create the risk of more hydrogen entering the steel. On the other hand, the thicker oxide layer can lead to greater contamination in the forming tool. In order to reliably avoid this effect, the content of alkaline earth metal or transition metal in the corrosion protection coating applied in work step c) can be limited in total to at most 1.5 wt. %, in particular at most 0.6 wt. %. The alkaline earth or transition metal contents of the corrosion protection coating applied in work step c) are thus in particular 0.11-1.5 wt. % or, in particular, 0.11-0.6 wt. %.

As already mentioned, Mg from the group of alkaline earth or transition metals has proven to be particularly suitable for the purposes according to the invention, which can be present in the coat applied according to the invention alone or in combination with other alkaline earth or transition metals, such as beryllium, calcium, strontium and barium, in order to be able to use the effects sought according to the invention.

Optionally, silicon ("Si") can also be present in the coat, which is applied in work step c) in contents of up to 15 wt. %, in particular up to 11 wt. %, in order to promote the formation of an iron aluminium layer, which adheres well to the iron surface set in work step b) and thereby takes up at most one third of the total layer thickness of the coat. If Si contents are too high, an excessively large alloy layer thickness would result, which in turn could lead to adhesion loss. Si contents of at least 3 wt. %, in particular at least 8.5 wt. %, prove to be particularly favourable in this respect, so that with an Si content of 3-15 wt. %, in particular 3-11 wt. %, in particular 8.5-11 wt. %, the positive influences of Si can be used particularly reliably in practice.

In addition, in the coat applied in the work step c) Fe can also optionally be present in contents of up to 5 wt. %, in particular up to 4 wt. %, in particular up to 3.5 wt. %. Iron would be set in this order of magnitude in the coat because this is the saturation value of an aluminium melt in the temperature range 650-720° C. By specifically adding iron to the melt, the risk of dissolving ferrous components of the melting crucible that come into contact with the melt can be reduced. In this respect, Fe contents of at least 1 wt. % prove to be particularly favourable, so that in practice the positive influences of Fe can be particularly reliably utilised with an Fe content of 1-5 wt. %, in particular 1-4 wt. %, especially 1-3.5 wt. %.

The corrosion protection coating can be applied in work step c) of the method according to the invention in any known manner. In this case, so-called "hot-dip aluminising" is in particular suitable, in which the respective flat steel product is guided through a suitably heated melt bath composed according to the specifications of the invention. Such a hot-dip coating is in particular suitable for strip-shaped flat steel products with a thickness of up to 3 mm. In the case of larger thicknesses, one of the vapour deposition processes (PVD, CVD) mentioned at the outset can also be used to apply the corrosion protection coating.

The load of a corrosion protection coating applied according to the invention in work step c) is typically 30-100 g/m², in particular 40-80 g/m² per side. The load on both sides of the coating is thus 60-200 g/m² in total.

After applying the corrosion protection coating (work step c)), the correspondingly coated flat steel product can optionally be subjected to dress rolling (work step d)) in order to set the mechanical characteristic values of the flat steel product, to adjust its surface roughness or to homogenise it. The forming degrees set for this (forming degree=(thickness before dress rolling−thickness after dress rolling)/(thickness before dress rolling)) are typically 0.1-5%.

After applying the corrosion protection coating (work step c)) or the optionally performed dress rolling (work step d)) a board is, if required, separated from the flat steel product in a manner known per se, the dimensions of which are adapted in a known manner to the dimensions of the sheet metal component to be hot-formed from it (work step e)).

The flat steel product itself or the board is then heated in work step f) to a hot forming temperature which is higher than the Ac3 temperature of the steel of the flat steel product and does not exceed 1000° C., in particular is at least equal to the Ac3 temperature+50° C. and is at most 980° C., wherein hot forming temperatures of 820-950° C. have proven to be particularly advantageous. The flat steel product is held at this temperature until a sufficient amount of heat is introduced into the flat steel product or the board separated therefrom. The holding time and annealing temperature required in each case can be estimated on the basis of the proviso that the heat energy quantity Js introduced into the flat steel product or the board in work step f) should be more than 100,000 kJs and at most 800,000 kJs, wherein Js can be calculated according to the following known equation:

$$Js\ [kJs]=[(T2-T1)\times c\times t\times m]/1000;$$

with T2: End temperature of the component at the end of heating in K
  T1: Start temperature of the component at the start of heating in K
  c: Heat capacity steel (typically 460 J/kgK)
  t: Holding time of the flat steel product or the board at the end temperature in s
  m: Mass of the flat steel product or the board in kg Heating can be carried out in any suitable way. In the event that a conventional continuous furnace is used for this purpose, in which the flat steel product or the board is heated by radiant heat, the suitable holding time is typically 100-900 s, preferably 180-720 s, in particular 240-600 s. In the event that a hot forming temperature of 850-930° C. is selected, holding times of 180-600 s, in particular 240-600 s, are generally sufficient in practice. As an alternative to the use of a continuous furnace, it is also possible, for example, to carry out heating in a conventional chamber furnace.

The heating of the flat steel product or the board can also take place in two steps in a manner also known per se in order to initially achieve a pre-alloying of the corrosion protection coating and subsequently bring the flat steel product or the board to the respective hot forming temperature.

The board heated to the hot forming temperature or the flat steel product heated to the hot forming temperature is inserted into the hot forming tool within a transfer time of typically less than 15 seconds, in particular less than 10 seconds, and then hot-formed there into the component (work step g)).

Subsequently or simultaneously, at least one section of the component obtained is cooled in a manner that is controlled and known per se, in order to generate the desired structure in the relevant section of the component. The cooling rates required for this are typically 20-500 K/s, wherein cooling rates of more than 30 K/s, in particular more than 50 K/s, are particularly practical. Cooling "of at least one section" also of course includes the possibility of cooling the component as a whole in the aforementioned manner in order to generate hardening structures in the entire component.

With the method according to the invention, the production of a sheet metal component, which is manufactured from a flat steel product, the steel substrate of which consists of a steel, which (in wt. %) consists of 0.05-0.5% C, 0.5-3% Mn, 0.06-1.7% Si, up to 0.06% P, up to 0.01% S, up to 1.0% Al, up to 0.15% Ti, up to 0.6% Nb, up to 0.01% B, up to 1.0% Cr, up to 1.0% Mo, wherein the total of the contents of Cr and Mo is at most 1.0%, up to 0.2% Ca, in particular up to 0.1% V, and as the remainder of iron and unavoidable impurities, and which is coated with a corrosion protection coating consisting of (in wt. %) up to 15% Si, up to 5% Fe, in total 0.1-5% of at least one alkaline earth or transition metal and as the remainder of Al and unavoidable impurities, wherein the layer of the corrosion protection coating adjoining the steel substrate is an interdiffusion layer consisting of ferrite with an Al content of up to 50 wt. %, in particular at least 1 wt. % Al, wherein in a cross-section of the interdiffusion layer, the proportion of the surface covered by pores with a diameter 0.1 μm is less than 10%, in particular less than 5%, preferably less than 3%, and wherein the surface covered with pores in the interdiffusion layer is <300 μm$^2$, in particular less than 200 μm$^2$, particularly preferably less than 100 μm$^2$ over a measurement length of 500 μm. The thickness of the alloy layer here is 1-30 μm, preferably 2-20 μm, in particular 4-16 μm.

DESCRIPTION OF THE INVENTION

Figure 1:
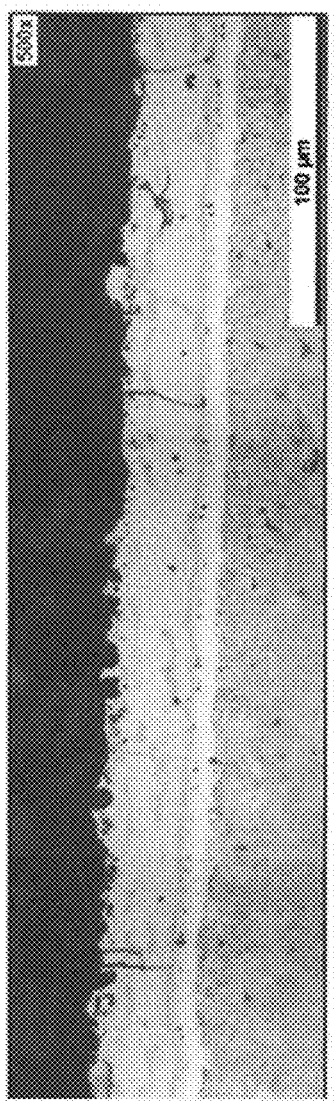
FIG. 1 shows a cross-section of a steel sheet of a sheet metal component manufactured according to the invention by hot forming in 500× magnification. The cross-section was prepared in a conventional manner by etching with 3% Nital in order to clarify the layer structure present on the steel sheet.
Figure 2:
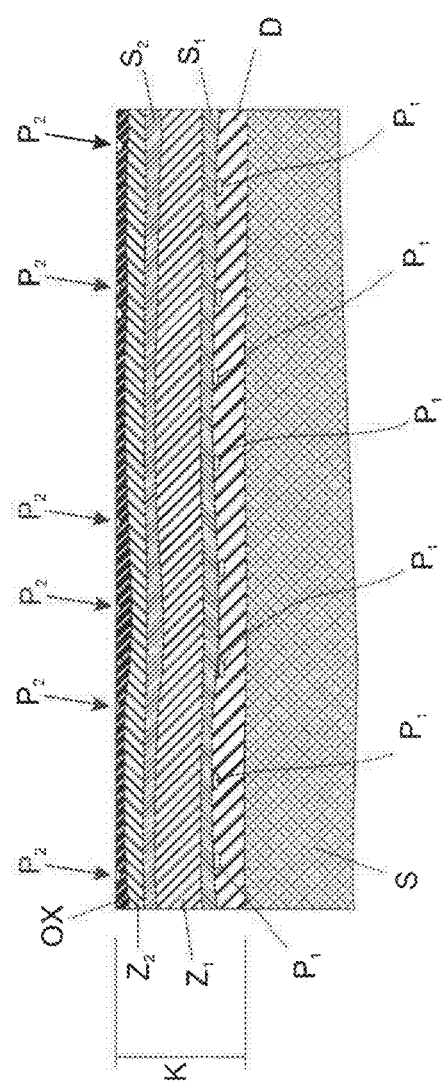
FIG. 2 shows a schematic representation of the cross-section according to FIG. 1.

The corrosion protection coating K formed on the steel substrate S comprises an interdiffusion layer D directly connected to the steel substrate S, which substantially consists of alpha mixed crystal (i.e. ferrite) with increased Al content. Fe2Al5 is still present here in phases. The interdiffusion layer D is characterised in that it is homogeneously and uniformly formed and that it is virtually pore-free.

In the direction of the free surface O of the corrosion protection coating K, a first Si-rich layer $S_1$ has formed on the diffusion layer D. At the boundary between the diffusion layer D and the Si-rich layer $S_1$, pores $P_1$ are present in the diffusion layer D in small numbers and far apart from one another.

In the direction of the free surface O on the Si-rich layer $S_1$, a first intermediate layer $Z_1$ has formed, which consists of aluminium iron, wherein the majority lies in the aluminium. Traces of Si, alkaline earth and/or transition metals as well as unavoidable impurities may also be present in the layer $S_1$. The intermediate layer $Z_1$ is pore-free.

In the direction of the free surface O on the intermediate layer $Z_1$ there is a second Si-rich layer $S_2$.

A second intermediate layer $Z_2$ is formed in the direction of the free surface O on the Si-rich layer $S_2$. The layer Z2 also consists of aluminium iron, with the majority being aluminium and alkaline earth and/or transition metals may also be present. Traces of Si as well as unavoidable impurities may also be present. The intermediate layer Z2 is also pore-free.

The second intermediate layer Z2 is covered on its side facing the free surface O with an oxide layer OX, which substantially consists of aluminium, silicon and alkaline earth and/or transition metal oxides. Oxide layer thicknesses of up to 1.5 μm can be present on average on a hot-formed component. Crater-shaped pores $P_2$, which are open to the environment, have formed in a small number and at large distance from one another on the surface of the oxide layer OX forming the free surface O of the corrosion protection coating K.

For comparison, a component was formed from a flat steel product which was covered with an AlSi coating according to the sample of the prior art described in EP 2 086 755. Its coating consisted of (in wt. %) 9.5% Si, 3.5% Fe and, as the remainder of aluminium and unavoidable impurities, was therefore free of alkaline earth or transition metals of the type added according to the invention.

The steel substrate of the flat steel product consisted of (in wt. %) 0.224% C, 0.25% Si, 1.16% Mn, 0.014% P, 0.002% S, 0.039% Al, 0.0034% N, 0.2% Cr, 0.03% Ti and 0.0026% B.

Before applying the metallic coating and forming into the flat steel product, the flat steel product processed for comparison has undergone an annealing treatment in a continuous furnace with four zones in which the dew point temperatures TP and annealing temperatures GT indicated in Table 6 have been set. The air ratio A in the continuous furnace was 0.98.

A five-layered layer structure of the corrosion protection coating has also been created for the component produced conventionally for comparison. However, compared to the number of pores in the coat of the component produced conventionally for comparison, in the component produced according to the invention, the number of pores P2 in the oxide layer OX was reduced by at least 25% and the number of pores P1 in the diffusion layer D by at least 40% compared with the pores present in the corresponding layers of the corrosion protection coating of the component produced conventionally for comparison. The area covered with pores P1 was 300 μm$^2$ after a dwell time in the furnace of 600 s with a measurement length of 500 μm in the layer D.

The reduction of pores in P2 leads to a reduction of paint craters and improves adhesion and weldability. The pores in P2 have openings in the direction of the atmosphere of a few nm. If a component is now processed further after hot forming as is typical for cars, it will undergo cathodic dip painting in addition to a larger number of cleaning steps. Contact with water-based solutions is unavoidable here. During cleaning, water can penetrate into the pores P2 of the layer, since the surfactants added to the cleaning water improve wetting and significantly reduce the surface tension of the water. Water can also penetrate the opened pores P2 in the cathodic dip painting process. In this particular case, the cleaning water also leads to a separation of the paint particles, which cannot penetrate into the pores P2 due to the size of the opening. Water, which is then present in the pores P2, reaches the boiling point when the paint layers are baked in, which leads to vapour phases which, in a kind of boiling delay, escapes explosively through the paint to the environment. As a result of this reaction, so-called paint craters form, which, in addition to visual influence, also significantly reduce the effect of the paint in terms of corrosion protection. In the case of aluminium-based coats in particular, corrosion and paint infiltration can occur at such points. The red rust that occurs, which is formed due to the high iron contents of the coating and stands out visually, is particularly problematic for the further processor.

Also, on a surface where many open pores P2 are present, adhesives cannot penetrate into the pores P2 due to their higher viscosity. This may result in incomplete coverage of the surface with adhesive. Cavities also form in the area of the pores, as a result of which adhesion is also impaired.

The pores P2 present in the layer OX also lead to changed current paths in the material during resistance spot welding, which negatively influence the weldability.

In the case of a high pore count, there is also an enlarged surface on which water can split during oxidation in the hot forming process. In this way, diffuse hydrogen can penetrate into the material, which is known to increase the risk of hydrogen-induced cracking.

By minimising the frequency at which the pores P2 occur during the manufacture of a sheet metal component according to the invention, the risks associated with pore formation in conventionally produced components can be effectively reduced.

The reduction of the number of pores P1 in diffusion layer D also leads to an increase in the transferable force of adhesive bonds and to an improvement in the weldability.

The pores in P2 represent cavities within the corrosion protection coating K. If the number of pores is too high, there is a risk that the corrosion protection coating K will break up at the boundary region between the diffusion layer D and the first Si-rich layer S1, with the result that the adhesive seam also fails at an early stage. With the reduction of the number of pores P1 achieved according to the invention, the area over which the forces of the adhesive bond are transferred is increased by over 60% and thus the risk of delamination fracture is correspondingly reduced.

In order to prove the effect of the invention, steel sheets each with a thickness of 1.5 mm and cold-rolled in a conventional manner have been produced from six steels ST1-ST6, the compositions of which are indicated in Table 1 (work step a) of the method according to the invention).

The steel sheets provided in this way were subjected in nine tests V1-V9 in each case to a continuous annealing G1, G2 or G3 in a continuous furnace, which had four consecutive zones A, B, C, D. Table 2 shows the dew point temperatures $TP_A$-$TP_D$ set in zones A-D for variants G1-G3 of the annealing, the annealing temperatures $GT_A$-$GT_D$ as well as the hydrogen content H2 and the nitrogen content N2 of the respective annealing atmosphere, the remainder of which consisted of technically unavoidable impurities (work step b) the method according to the invention).

The samples annealed in this way are each coated in a conventional manner with a Al-based corrosion protection coating Z1-Z5 with a load AG. The compositions of the corrosion protection coatings Z1-Z5 are indicated in Table 3 (work step c) of the method according to the invention).

The samples each provided with one of the corrosion protection coatings Z1-Z5 were heated in each case in the tests V1-V9 in the continuous furnace to a hot forming temperature $T_{WU}$ at which they were held for a holding time $t_{WU}$ (work step f) of the method according to the invention.

The steel ST1-ST6, of which the samples each used in the tests V1-V9 consisted, the variants G1-G3 of the annealing each used in the tests V1-V9, the compositions Z1-Z5 of the corrosion protection coatings each produced in the tests V1-V9 and their respective loads AG as well as the hot forming temperatures $T_{WU}$ and holding times $t_{WU}$ each selected in the tests V1-V9 are indicated in Table 4.

The samples heated in this way were taken from the continuous furnace in a transfer time of 3-7 s in each case and placed in a conventional hot forming tool in which they were hot-formed into a component. Subsequently, cooling took place at 270 K/s in each case to room temperature (work steps g) and h) the method according to the invention.

Of the components obtained in the tests V1-V9, three cross-sections were produced in a manner known per se, which were etched with 3% Nital to clarify the layer structure. Illustrations of the cross-sections were generated in 500× magnification, as shown by way of example in FIG. 1. In the respective illustration, the pores P1, P2 present in the layers OX and D were counted over a section with a length of 550 μm. The arithmetic mean was formed from the counter results determined for the three cross-sections of a sample in each case. This arithmetic mean of the numbers determined for the pores P1 and P2 has been compared with the comparative values determined in the same way for a comparative sample.

The relative reduction in pore counts P1 and P2 resulting from this comparison and achieved by the invention is indicated in Table 5. Table 5 also shows the proportion of paint craters in the total area of the respective sample, the decrease in the delamination area and the welding region determined in accordance with the steel-iron test sheet SEP 1220-2. Welding regions greater than 1 kA have been classified as "OK".

TABLE 1

| Steel | C | Si | Mn | P | S | Al | Nb | Ti | B |
|---|---|---|---|---|---|---|---|---|---|
| A | 0.08 | 0.33 | 0.95 | 0.025 | 0.02 | 0.013 | 0.09 | 0.01 | 0.005 |
| B | 0.23 | 0.38 | 1.3 | 0.02 | 0.007 | 0.013 | — | 0.03 | 0.004 |
| C | 0.38 | 0.37 | 1.38 | 0.02 | 0.008 | 0.013 | — | 0.1 | 0.005 |
| D | 0.2 | 0.35 | 1.35 | 0.02 | 0.008 | 0.012 | — | 0.02 | 0.004 |
| E | 0.14 | 0.25 | 1.07 | 0.1 | 0.001 | 0.08 | 0.025 | 0.01 | 0.002 |
| F | 0.24 | 0.3 | 1.3 | 0.022 | 0.008 | 0.012 | — | 0.02 | 0.004 |

Information in wt. %, the remainder Fe and unavoidable impurities

TABLE 2

| Annealing | Lambda value | Dew point temperature TP [° C.] | | | | Annealing temperature GT [° C.] | | | | Annealing atmosphere GA [vol %] | |
|---|---|---|---|---|---|---|---|---|---|---|---|
| | | A | B | C | D | A | B | C | D | H2 | N2 |
| G1 | 1.05 | −25 | −40 | −40 | −20 | 880 | 880 | 850 | 800 | 7 | 91 |
| G2 | 1.1 | −20 | −40 | −45 | −25 | 890 | 890 | 830 | 800 | 10 | 87 |
| G3 | 0.95 | −12 | −30 | −47 | −22 | 890 | 900 | 900 | 820 | 5 | 92 |

TABLE 3

| Corrosion protection coating | Mg | Si | Fe |
|---|---|---|---|
| Z1 | 0.3 | 9.5 | 3 |
| Z2 | 0.5 | 8 | 3.5 |
| Z3 | 0.1 | 10 | 3 |
| Z4 | 2 | 8 | 2 |
| Z5 | 0.8 | 8 | 3 |

Information in wt. %, remainder Al and unavoidable impurities

TABLE 4

| Test | Steel | Annealing | Corrosion protection coating | AG [g/m$^2$] | Twu [° C.] | twu [s] |
|---|---|---|---|---|---|---|
| V1 | A | G1 | Z3 | 69 | 920 | 300 |
| V2 | B | G2 | Z2 | 70 | 920 | 180 |
| V3 | C | G1 | Z3 | 75 | 925 | 360 |
| V4 | D | G3 | Z5 | 65 | 920 | 420 |
| V5 | E | G1 | Z1 | 70 | 900 | 300 |
| V6 | F | G3 | Z4 | 71 | 920 | 360 |
| V7 | H | G2 | Z1 | 65 | 925 | 360 |
| V8 | B | G1 | Z3 | 72 | 920 | 300 |
| V9 | D | G3 | Z2 | 71 | 925 | 300 |

TABLE 5

| Test | Reduction of pores P1 [%] | Reduction of pores P2 [%] | Paint craters [%] | Decrease in delamination fracture area [%] | Welding region [kA] |
|---|---|---|---|---|---|
| V1 | 25 | 50 | 8.4 | 67 | 1.1 |
| V2 | 30 | 75 | 10.5 | 70 | 1 |
| V3 | 28 | 43 | 9.5 | 62 | 1.2 |
| V4 | 35 | 52 | 10.9 | 60 | 1.1 |
| V5 | 33 | 60 | 11.6 | 65 | 1.2 |
| V6 | 25 | 58 | 7.8 | 63 | 1 |
| V7 | 37 | 57 | 12.5 | 60 | 1.1 |
| V8 | 33 | 70 | 11.6 | 70 | 1 |
| V9 | 28 | 65 | 9.5 | 69 | 1.2 |

TABLE 6

| Zone | T$_P$ [° C.] | T$_G$ [° C.] |
|---|---|---|
| A | −30 | 750 |
| B | −23 | 780 |
| C | −25 | 780 |
| D | −35 | 740 |

The invention claimed is:

1. A sheet metal component manufactured from a flat steel product, the steel substrate of which consists of a steel, comprising, in wt. %: 0.05-0.5% C, 0.5-3% Mn, 0.06-1.7% Si, up to 0.06% P, up to 0.01% S, up to 1.0% Al, up to 0.15% Ti, up to 0.6% Nb, up to 0.01% B, up to 1.0% Cr, up to 1.0% Mo, wherein the total of the contents of Cr and Mo is at most 1.0%, up to 0.2% Ca, up to 0.1% V, and as the remainder of iron and unavoidable impurities, which is coated with a corrosion protection coating consisting of in addition to Al, Fe, and unavoidable impurities, in wt. %: up to 15% Si, and in total 0.1-5% of at least one alkaline earth or additional transition metal, wherein a layer of the corrosion protection coating adjoining the steel substrate is an interdiffusion layer (D) consisting of ferrite with an Al content of up to 50 wt. %.

2. The sheet metal component according to claim 1, wherein the corrosion protection coating comprises up to 5% Fe in addition to the total 0.1-5% of at least one alkaline earth or additional transition metal.

3. The sheet metal component according to claim 1, wherein in a cross-section of the interdiffusion layer (D), the proportion of the surface covered by pores with a diameter ≥0.1 μm is less than 10%.

4. The sheet metal component according to claim 1, wherein in a cross-section of the interdiffusion layer (D), the surface covered with pores in the interdiffusion layer (D) is <300 μm$^2$ over a measurement length of 500 μm.

5. The sheet metal component according to claim 1, wherein the interdiffusion layer (D) has a thickness of 1-30 μm.

6. The sheet metal component according to claim 1, wherein the transition metal comprises at least one element selected from Sc, Ti, V, Cr, Mn, Co, Ni, Cu, Zn, Y, Zr, Nb, Mo, Tc, Ru, Rh, Pd, Ag, Cd, Hf, Ta, W, Re, Os, Ir, Pt, Au, Hg, Rf, Db, Sg, Bh, and Hs.

7. The sheet metal component according to claim 1, wherein the at least one alkaline earth or additional transition metal is at least one alkaline earth metal.

8. A sheet metal component manufactured from a flat steel product, the steel substrate of which consists of a steel, comprising, in wt. %: 0.05-0.5% C, 0.5-3% Mn, 0.06-1.7% Si, up to 0.06% P, up to 0.01% S, up to 1.0% Al, up to 0.15% Ti, up to 0.6% Nb, up to 0.01% B, up to 1.0% Cr, up to 1.0% Mo, wherein the total of the contents of Cr and Mo is at most 1.0%, up to 0.2% Ca, up to 0.1% V, and as the remainder of iron and unavoidable impurities, which is coated with a corrosion protection coating consisting of in addition to Al, Fe, and unavoidable impurities, in wt. %: up to 15% Si, and in total 0.1-5% of at least one alkaline earth metal, wherein a layer of the corrosion protection coating adjoining the steel substrate is an interdiffusion layer (D) consisting of ferrite with an Al content of up to 50 wt. %.

* * * * *